April 26, 1960     J. F. DAVIN, JR     2,933,876
DOWN CORN LIFTER
Filed Aug. 8, 1957
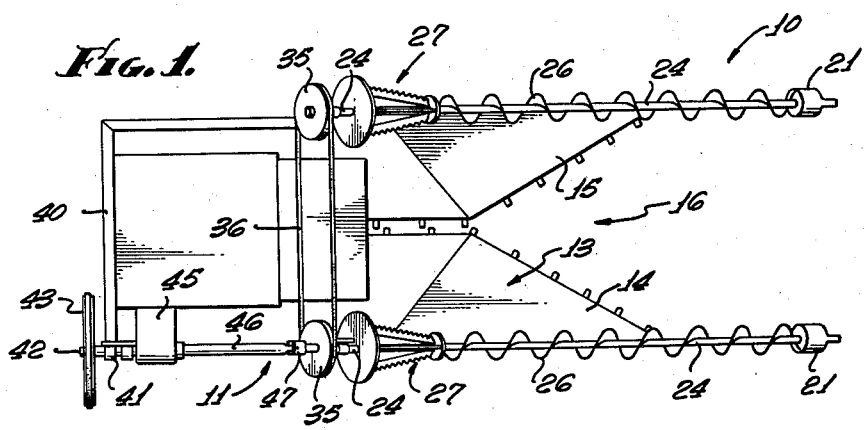
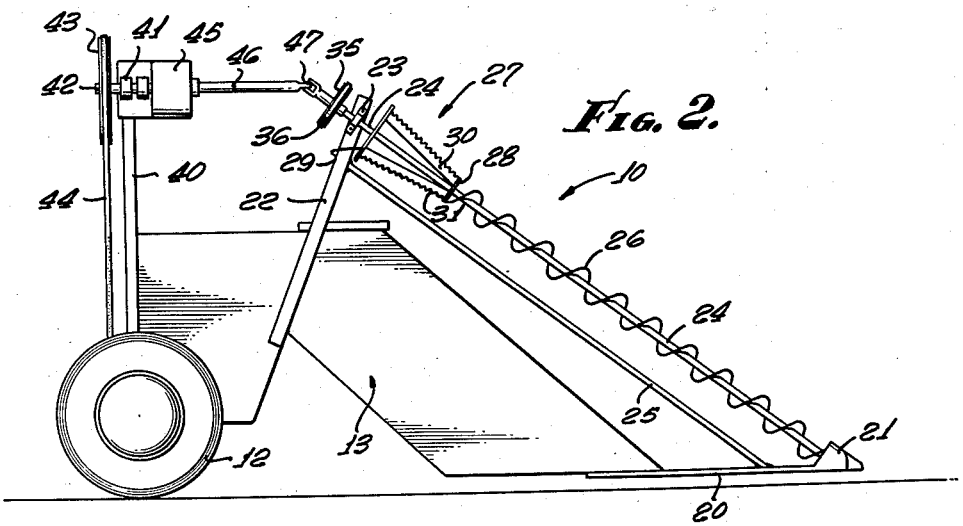
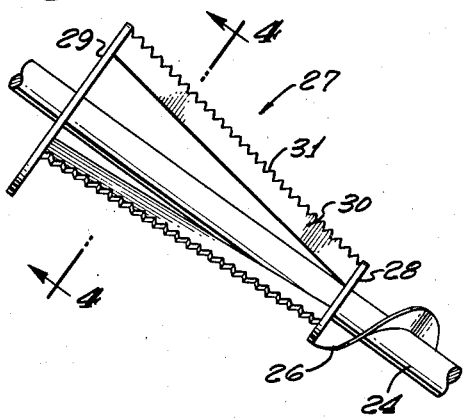
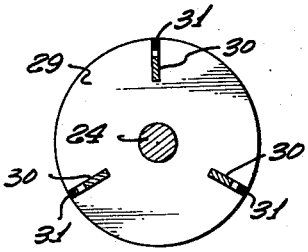
JOSEPH F. DAVIN, JR.
INVENTOR.
BY
ATTORNEY.

2,933,876

DOWN CORN LIFTER

Joseph F. Davin, Jr., Bakersfield, Calif.

Application August 8, 1957, Serial No. 677,154

7 Claims. (Cl. 56—119)

This invention relates to an improvement in corn harvesting machines in which the corn is cut while standing and then, as the machine proceeds down the field, is chopped or cut up into ensilage and deposited in a wagon so that it may be conveniently blown up into a silo. Machines of this general type have been produced heretofore which are effective for this purpose. These machines however are primarily adapted for use in harvesting rows of corn in which the stalks are standing upright.

It is an object of this invention to provide a corn harvesting machine embodying means making it practical to use said machine for harvesting corn in the field where the stalks of corn have been blown down substantially parallel to the ground by high winds.

Where the corn is blown down near to the ground and is harvested by the application of such a harvester equipped with the present invention it is necessary to proceed along one row in a given direction in which the corn has been blown towards the right of the harvester and then return in the opposite direction in which case the corn has been blown to the left of the harvester.

It is still another object of the invention to provide such a corn harvester with means for harvesting corn which has been blown down and which will function equally well when traveling in opposite directions relative to the direction in which the wind has blown down the corn.

The manner of accomplishing the foregoing objects as well as further objects and advantages will be made manifest in the following description taken in connection with the accompanying drawings in which Fig. 1 is a diagrammatic plan view of a corn harvester embodying the down corn lifter of the present invention.

Fig. 2 is a side elevational view of Fig. 1.

Fig. 3 is an enlarged fragmentary side elevational view of the paddle wheel of the invention which is provided on the upper end of each of the conveyor screws employed therein.

Fig. 4 is a cross-sectional view taken on the line 4—4 of Fig. 3 and illustrates the spacing of the blades of said paddle wheel.

Referring specifically to the drawings, the invention is there shown as comprising a down corn lifter attachment 10 which is embodied with a corn harvester 11. The harvester includes a wheeled carriage 12 which is adapted to be towed behind a farm tractor and which has mounted thereon a corn gathering means 13 providing widely divergent guides 14 and 15 which outline a wide mouth 16 which is symmetrical with the longitudinal axis of the harvester. The gathering means 13 may be substantially like the corresponding means identified by reference numerals 12 through 23 in U.S. patent to Baker No. 1,777,112.

Extending forwardly from the guides 14 are bearing bars 20 each of which has a bearing 21 provided at its forward extremity. Posts 22 extend upwardly from the harvester body to carry bearings 23. Shafts 24 journal at their opposite ends in bearings 21 and 23. Rods 25 unite bars 20 and posts 22 to brace said bars and confine corn within mouth 16. Each shaft 24 has provided thereon a relatively small diameter conveyor screw 26 the lower end of which is close to the bearing 21 and the upper end of which is spaced a substantial distance from the bearing 23.

Also mounted upon each shaft 24 is a paddle wheel 27 which is disposed between the upper end of the conveyor 26 and the bearing 23. This paddle wheel comprises disks 28 and 29 and blades 30 which extend between and have their opposite ends integrally united with said disks. As disk 29 is above the disk 28, and of substantially larger diameter, and as the outer edges of the blades 30 conform to the peripheries of said disks, these edges define the surface of a truncated cone, the base of which is disposed upwardly. The number of blades 30 employed in the paddle wheels 27 may vary, but three such blades have been found to operate very satisfactorily. The outer edges of blades 30 are provided with serrations 31.

The ends of shafts 24 which extend upwardly beyond bearings 23 are provided with pulleys 35 which are connected by a belt 36 so that when one of the shafts 24 rotates, the corresponding shaft on the opposite side of the machine also rotates in the same direction and at the same speed. Supported on a frame 40 extending upwardly from the rear end of the harvester 13 is a double bearing 41 in which a shaft 42 journals, this shaft having a pulley 43 which is connected by a belt 44 with a drive pinion (not shown) powered by the power unit of the harvester. The shaft 42 connects through a reversing gear box 45 and a telescopic shaft 46 and a universal joint 47 with the upper end of one of the shafts 24 so as to rotate both of these shafts when the harvester is in operation.

The reverse gear box 45 is adapted to be operated by the tractor driver so that he may control the direction of rotation of the shaft 46 and the shafts 24 as the harvester 16 is being driven along a line of corn. Thus, whichever screw 26 is on the down corn side of the line of corn being harvested, the reverse gear box 45 will be controlled by the tractor driver to cause the screw conveyor 26 on that side of the harvester to be rotated so that the upwardly disposed elements of said conveyor will travel inwardly toward the center of the harvester.

Particular attention is drawn to the fact that the forward ends of the screw conveyors 26 are located well in advance of the guides 14 and 15 of the harvester 13 and are disposed substantial distances laterally from the center line of the harvester which, of course, is also the center line of the row of corn being harvested. It is also to be noted that the screw conveyors 26 are of relatively small diameter and adjacent turns thereof are thus spaced fairly close together.

The blades on the respective screw conveyors 26 on opposite sides of the machine are oppositely pitched so that whenever one of these conveyors is rotating to move upwardly disposed portions thereof towards the center of the harvester 11, the blades of that conveyor will travel in an upward direction.

The function of each of the paddle wheels 27 is to beat inwardly from over its respective spiral conveyor the upper portions of the down stalks of corn which have been elevated upwardly by said screw conveyor. These paddle wheels thus ensure that the upper ends of the screw conveyors do not get jammed with cornstalks.

While it has been found preferable to employ the reverse gear 45 to change the direction of rotation of the shafts 24 when reversing the direction of travel of the harvester 11, it is to be understood that these shafts may be rotated continuously in opposite directions by crossing the belt 36 which connects the pulleys 35. With the shafts 24 thus driven, both screw conveyors could be rotated with their upwardly disposed portions moving towards the center of the harvester 11 at all times.

While only a single embodiment of the invention has been disclosed herein, it is to be understood that various modifications may be made in this without departing from the spirit of the invention or the scope of the appended claims.

The claims are:

1. In a harvester for harvesting corn, much of which is blown down, which harvester includes a wheeled carriage embodying a corn gathering means having forwardly extending divergent corn stalk guides forming a wide mouth in said gathering means for receiving corn stalks as said harvester advances, the front ends of said guides being pointed and disposed close to the ground, the combination of: a conveyer screw; means for journalling one end of said screw on said front end of one of said guides, said screw extending upwardly above said guide and being sharply inclined rearwardly from said journalling means, said screw being disposed approximately above and spaced upwardly from the lateral outer side edge of said one of said guides; means on the harvester for journalling the upper end of said screw; means on the harvester for rotating said screw in a direction so that the upwardly disposed components thereof travel towards the center of said gathering means, said screw being pitched to convey stalks resting thereon upwardly along said screw when the screw is so rotated; and a paddle wheel mounted coaxially with and at the upper end of said screw, said paddle wheel being rotated by said rotating means in the same direction as said screw and at sufficient speed to deliver a substantial inward tangential force to said stalks when the latter are delivered by said conveyer screw to said paddle wheel.

2. A combination as in claim 1 in which said paddle wheel has blades with serrated edges.

3. A combination as in claim 1 in which said paddle wheel has blades the outer edges of which unite to define a cone, the base of which is disposed upwardly.

4. A combination as in claim 3 in which said blade edges are serrated.

5. A combination as in claim 1 in which there are two conveyor screws and two paddle wheels as defined therein, one of each of these being on the right hand side of said harvester and the other screw and paddle wheel being on the left hand side of said harvester; and means for operating each of said screws and its associated paddle wheel in the manner aforesaid when said screw is on the down corn side of said harvester.

6. A combination as in claim 5 in which the drive means for said conveyor screws and paddle wheels drives said screws and paddle wheels all in the same direction; and reversing means for revering the direction of rotation of said conveyor screws and paddle wheels.

7. A combination as in claim 1 in which said paddle wheel is united coaxially with said screw and derives its rotation from the rotation of said screw.

References Cited in the file of this patent

UNITED STATES PATENTS

| | | |
|---|---|---|
| 1,777,112 | Baker | Sept. 30, 1930 |
| 2,477,794 | Gehl | Aug. 2, 1949 |
| 2,771,731 | Heth et al. | Nov. 27, 1956 |

FOREIGN PATENTS

| | | |
|---|---|---|
| 513,153 | Germany | Nov. 22, 1930 |